United States Patent
Bellala et al.

(10) Patent No.: US 9,929,559 B2
(45) Date of Patent: Mar. 27, 2018

(54) ELECTRICITY STORAGE DEVICE, ELECTRICITY STORAGE SYSTEM, AND METHOD FOR CONTROLLING ELECTRICITY STORAGE DEVICE

(71) Applicant: SONY CORPORATION, Tokyo (JP)

(72) Inventors: Raghunath Bellala, Fukushima (JP); Eiji Kumagai, Kanagawa (JP)

(73) Assignee: MURATA MANUFACTURING Co., Ltd., Kyoto (JP)

( * ) Notice: Subject to any disclaimer, the term of this patent is extended or adjusted under 35 U.S.C. 154(b) by 203 days.

(21) Appl. No.: 14/909,081

(22) PCT Filed: May 29, 2014

(86) PCT No.: PCT/JP2014/002838
§ 371 (c)(1),
(2) Date: Jan. 29, 2016

(87) PCT Pub. No.: WO2015/015682
PCT Pub. Date: Feb. 5, 2015

(65) Prior Publication Data
US 2016/0164282 A1    Jun. 9, 2016

(30) Foreign Application Priority Data

Jul. 31, 2013 (JP) .................................. 2013-158845

(51) Int. Cl.
*H02J 1/00* (2006.01)
*H02J 3/38* (2006.01)
(Continued)

(52) U.S. Cl.
CPC ................ *H02J 1/00* (2013.01); *H02J 3/383* (2013.01); *H02J 7/0065* (2013.01);
(Continued)

(58) Field of Classification Search
CPC ..... H02J 7/007; H02J 2007/095; B60L 11/18; B60L 11/1809; Y02E 10/563; Y02E 10/10566
See application file for complete search history.

(56) References Cited

FOREIGN PATENT DOCUMENTS

JP    2004-289954 A    10/2004
JP    2013-021778 A    1/2013

OTHER PUBLICATIONS

Office Action for CN Patent Application No. 201480041584.5, dated Sep. 28, 2017, 7 pages of Office Action and 10 pages of English Translation.

(Continued)

*Primary Examiner* — Robert DeBeradinis
(74) *Attorney, Agent, or Firm* — Chip Law Group

(57) ABSTRACT

A first power source line disposed between a positive electrode side of an electricity storage unit and a first external terminal, a second power source line disposed between a negative electrode side of the electricity storage unit and a second external terminal, a power source circuit connected to both the first and second power source lines and configured to supply an output voltage to a control circuit in an operating state, a power source control circuit configured to control an operating state and a non-operating state of the power source circuit, a first control signal generation circuit configured to supply a first control signal corresponding to transition of an external voltage applied to the first external terminal and the second external terminal to the power source control circuit to set the power source circuit in an operating state for a prescribed time, and a second control signal generation circuit configured to generate a second control signal that allows the power source circuit to be set in an operating state continuously by the (Continued)

control circuit to which an output voltage of the power source circuit is supplied are included.

6 Claims, 12 Drawing Sheets

(51) Int. Cl.
    *H02J 7/00*          (2006.01)
    *H02J 7/35*          (2006.01)
    *B60L 11/18*        (2006.01)

(52) U.S. Cl.
    CPC .............. *H02J 7/0068* (2013.01); *H02J 7/35* (2013.01); *H02J 2007/0095* (2013.01); *Y02E 10/563* (2013.01); *Y02E 10/566* (2013.01)

(56) References Cited

OTHER PUBLICATIONS

Office Action for EP Patent Application No. 14831708.4, dated Dec. 7, 2017, 4 pages.

ELECTRICITY STORAGE DEVICE, ELECTRICITY STORAGE SYSTEM, AND METHOD FOR CONTROLLING ELECTRICITY STORAGE DEVICE

TECHNICAL FIELD

The present disclosure relates to, for example, an electricity storage device, an electricity storage system, and a method for controlling an electricity storage device in which the voltage of a secondary battery is used to start up the power source.

BACKGROUND ART

The uses of lithium ion secondary batteries etc. are expanding to electricity storage devices for electric power storage, automobile storage batteries, home electrical appliances, etc. combined with renewable energy systems such as solar cells and wind power generation. These days, an electricity storage device in which one or a plurality of electricity storage modules (also called assembled batteries etc.) are connected is used in order to generate large output. The electricity storage module is formed by, for example, one or a plurality of battery blocks being housed in an outer case. The battery block is formed by a plurality of unit batteries (also called electric cells or cells; in the following description, simply referred to as batteries as appropriate), which are an example of the electricity storage element, being connected.

In Patent Literature 1 below, an electricity storage device in which startup is performed using a battery of such an electricity storage device is described.

CITATION LIST

Patent Literature

Patent Literature 1: JP 2013-21778A

SUMMARY OF INVENTION

Technical Problem

It is described that the electricity storage device described in Patent Literature 1 performs startup using an external voltage when the voltage of the battery is low. However, the startup is performed by detecting the presence of an external voltage of a prescribed value or more; hence, when a plurality of electricity storage devices are connected in parallel, there has been a concern that an electricity storage device cannot be shut down at a desired timing because there is a voltage from another electricity storage device.

Thus, according to the present disclosure, there is provided an electricity storage device, an electricity storage system, and a method for controlling an electricity storage device in which the electricity storage device can be shut down even in a system in which electricity storage devices are connected in parallel.

Solution to Problem

In order to solve the above problem, according to the present disclosure, there is provided an electricity storage device including: a first external terminal and a second external terminal for connection to an outside; an electricity storage unit capable of being charged and discharged; a first power source line disposed between a positive electrode side of the electricity storage unit and the first external terminal; a second power source line disposed between a negative electrode side of the electricity storage unit and the second external terminal; a power source circuit connected to both the first and second power source lines and configured to supply an output voltage to a control circuit in an operating state; a power source control circuit configured to control an operating state and a non-operating state of the power source circuit; a first control signal generation circuit configured to supply a first control signal corresponding to transition of an external voltage applied to the first external terminal and the second external terminal to the power source control circuit to set the power source circuit in an operating state for a prescribed time; and a second control signal generation circuit configured to generate a second control signal that allows the power source circuit to be set in an operating state continuously by the control circuit to which an output voltage of the power source circuit is supplied.

According to the present disclosure, there is provided an electricity storage system in which a plurality of electricity storage devices are connected. Each of the electricity storage devices includes a first external terminal and a second external terminal for connection to an outside, an electricity storage unit capable of being charged and discharged, a first power source line disposed between a positive electrode side of the electricity storage unit and the first external terminal, a second power source line disposed between a negative electrode side of the electricity storage unit and the second external terminal, a power source circuit connected to both the first and second power source lines and configured to supply an output voltage to a control circuit in an operating state, a power source control circuit configured to control an operating state and a non-operating state of the power source circuit, a first control signal generation circuit configured to supply a first control signal corresponding to transition of an external voltage applied to the first external terminal and the second external terminal to the power source control circuit to set the power source circuit in an operating state for a prescribed time, and a second control signal generation circuit configured to generate a second control signal that allows the power source circuit to be set in an operating state continuously by the control circuit to which an output voltage of the power source circuit is supplied.

Advantageous Effects of Invention

According to at least one embodiment, a problem in that, when a configuration in which an electricity storage device is started up by an external voltage is employed, the electricity storage device cannot be shut down by a control device can be solved.

DESCRIPTION OF EMBODIMENTS

Hereinbelow, embodiments are described. The description is given in the following order.
<1. First embodiment>
<2. Modification example of the first embodiment>
<3. Second embodiment>
<4. Modification examples>
<5. Application examples>

The embodiments described below are preferred specific examples, and various technically preferred limitations are given; however, the scope of the present disclosure is not limited to these embodiments unless there is a particular description of limiting the present disclosure in the following description.

1. First Embodiment

Overview of the Electricity Storage Module

When a large number of electricity storage elements, such as battery cells, are used in order to generate large output, a configuration in which a plurality of electricity storage units (hereinafter, referred to as electricity storage modules) are connected and a control device is provided in common for the plurality of electricity storage modules is employed as an example. The electricity storage module is an unit housed in an outer case in which a battery block and a module controller are combined. The battery block is, for example, a block in which 8 lithium ion secondary batteries in a circular cylindrical shape are connected in parallel. In the outer case of the electricity storage module, for example, 16 battery blocks are connected in series. The number and connection configuration of battery blocks may be altered as appropriate. Furthermore, secondary batteries other than lithium ion secondary batteries may be used.

The electricity storage module includes the outer case. For the outer case, a material having a high thermal conductivity and emissivity is preferably used. By using a material having a high conductivity and emissivity, good heat dissipation properties in the outer case can be obtained. By obtaining good heat dissipation properties, the temperature increase in the outer case can be suppressed. Furthermore, the opening of the outer case can be minimized or eliminated, and high dust-proof and drip-proof properties can be achieved. For the outer case, for example, a material such as aluminum, aluminum alloy, copper, or copper alloy is used.

Overview of the Electricity Storage Device

Figure 1:
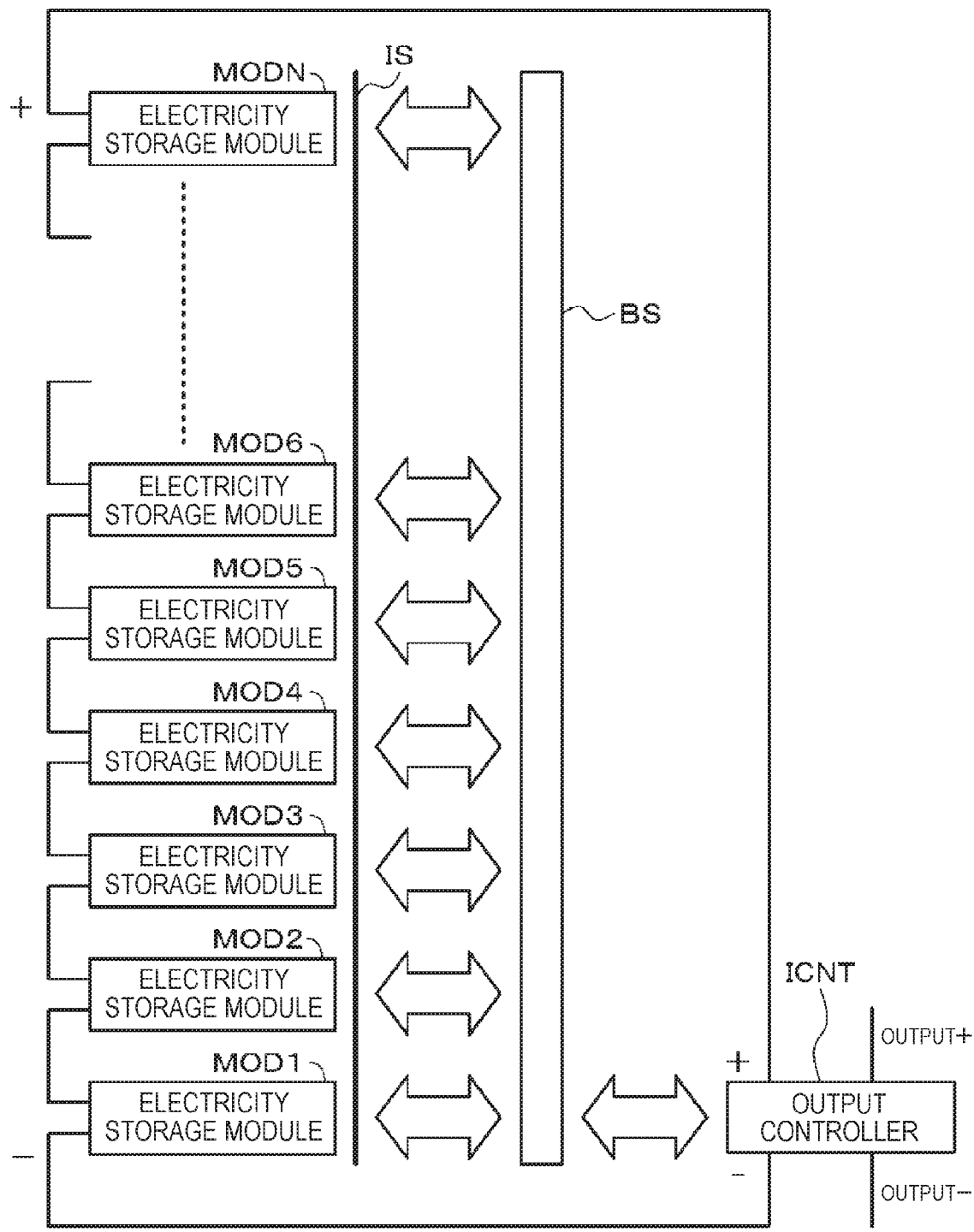
FIG. 1 is a block diagram showing an example of the configuration of an electricity storage device.

An overview of an electricity storage device configured to use a plurality of electricity storage modules will now be described. FIG. 1 shows an example of the electricity storage device. In the electricity storage device, N electricity storage modules MOD1 to MODN are connected in series. The number and connection configuration of connected electricity storage modules may be altered as appropriate. The electricity storage modules MOD1 to MODN are connected to an interface bus BS via an insulating unit IS.

Each electricity storage module MOD is provided with an insulating interface IF for making a connection between a module controller CNT and the interface bus BS in the outside. The insulating interface IF is in charge of the insulation between the electricity storage module MOD and the interface bus BS. Each module controller CNT is connected to a control device (hereinafter, referred to as an output controller as appropriate) ICNT for the whole, and the output controller ICNT performs charging management, discharging management, and management for degradation suppression etc.

As the bus in the electricity storage module and the bus BS connecting the electricity storage modules MOD1 to MODN and the output controller ICNT, a serial interface is used. As the serial interface, specifically, a system management bus (SM bus) or the like is used. For example, an I2C bus may be used. The I2C bus is a synchronous serial communication that performs communication using two signal lines of a serial clock (SCL) and bidirectional serial data (SDA).

The controller CNT of each electricity storage module MOD and the output controller ICNT communicate with each other. That is, the output controller ICNT receives the information of the internal state of each electricity storage module MOD, and the charging processing and discharging processing of each electricity storage module MOD are managed. The output controller ICNT supplies the output of the series connection of the N electricity storage modules MOD to a load. Connection can be made between electricity storage modules MOD. When the output voltage of one electricity storage module MOD is set to, for example, 51.2 V and N=1 to N=16, an output voltage of approximately 50 V to approximately 800 V is generated.

Figure 2:
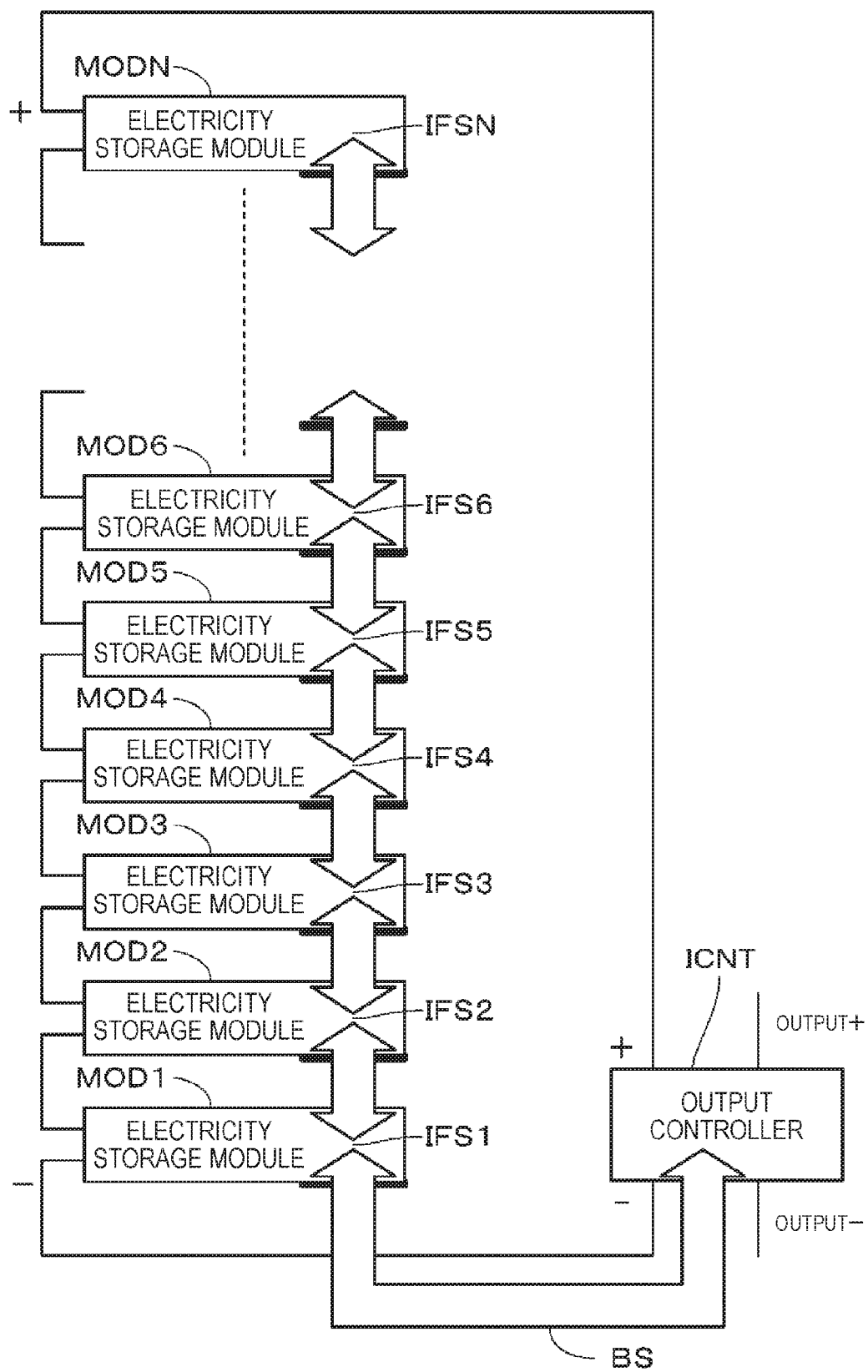
FIG. 2 is a block diagram showing another example of the configuration of the electricity storage device.

FIG. 2 shows another example of the electricity storage device. In the other example, N electricity storage modules MOD1 to MODN are connected in series. Each of the electricity storage modules MOD1 to MODN includes an insulating interface that provides insulation between electricity storage modules MOD. The module controller CNT of each electricity storage module MOD performs the communication with a higher or lower ranked electricity storage module MOD or the communication with the output controller ICNT in the outside via photocouplers IFS1 to IFSN, which are an example of the insulating interface.

The output controller ICNT is connected to the lowest ranked electricity storage module MOD1. The output controller ICNT controls the entire battery system. The output controller ICNT receives the information of the internal state of each electricity storage module MOD, and supplies and blocks a charging current and a discharging current to each electricity storage module MOD; thereby, the charging and discharging of each electricity storage module MOD are controlled. A control signal from the output controller ICNT is transmitted to a higher ranked electricity storage module MOD via a lower ranked electricity storage module MOD, for example.

Figure 3:
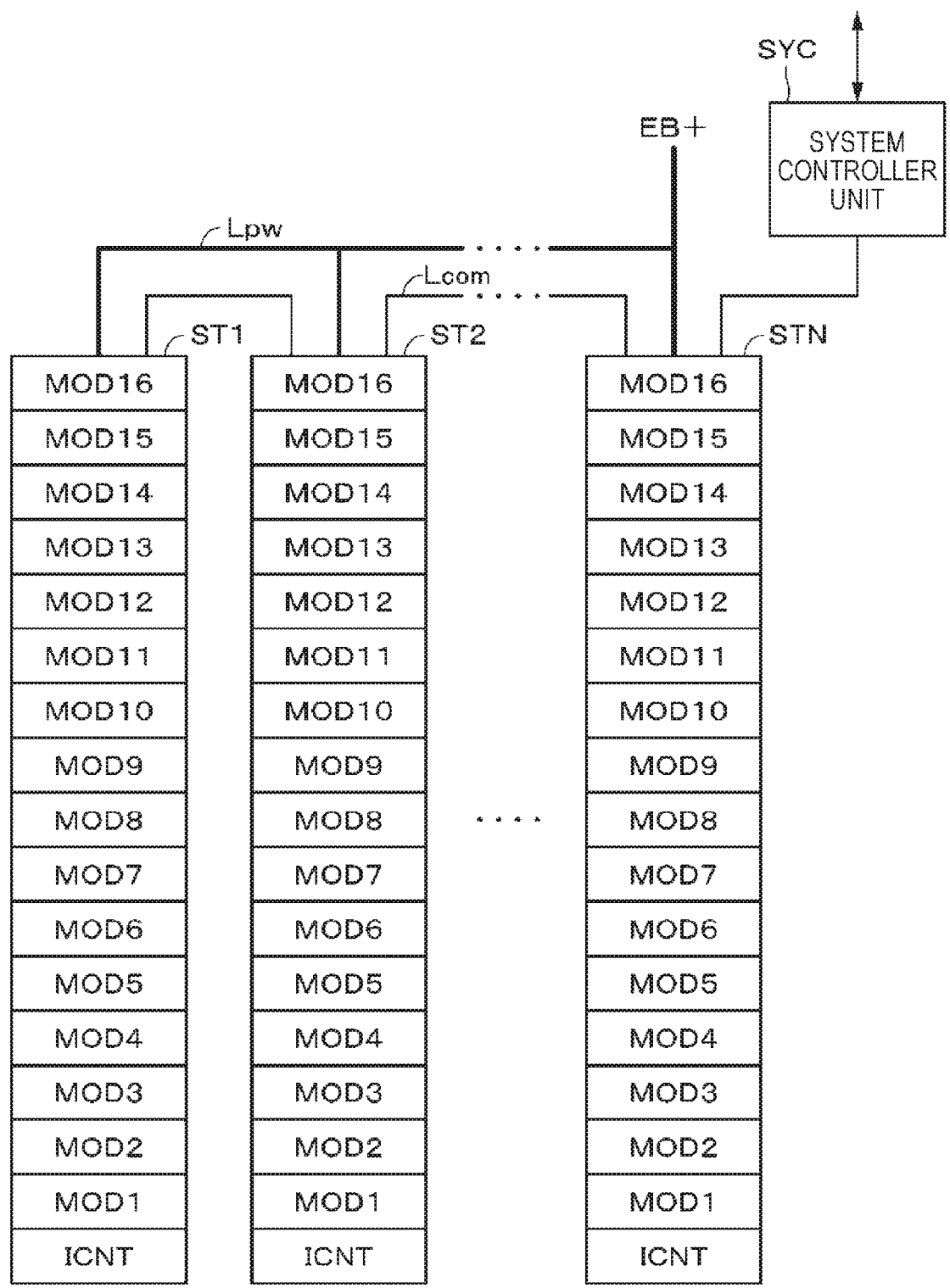
FIG. 3 is a block diagram showing an example of the specific configuration of an electricity storage system.

The electricity storage device composed of a plurality of electricity storage modules and the output controller ICNT described above is referred to as a string. N strings ST1 to STN are connected in parallel as shown in FIG. 3; thus, a power source system is formed. As an example, each string is composed of 16 electricity storage modules MOD1 to MOD16 and the output controller ICNT.

A power line Lpw that connects the output power terminals of the strings ST1 to STN in parallel is provided, and electric power (voltage EB+) is extracted to the outside via the power line Lpw. The output controllers ICNT of the strings ST1 to ST4 are connected to each other via a communication channel line Lcom. As the communication channel line Lcom, CAN, RS485, etc. are used. The communication channel line Lcom is connected to a system control unit SYC. The system control unit SYC controls an electricity storage unit composed of the stings ST1 to STN. The system control unit SYC is further connected to a not-illustrated controller in the outside.

Configuration of the Electricity Storage Device

Figure 4:
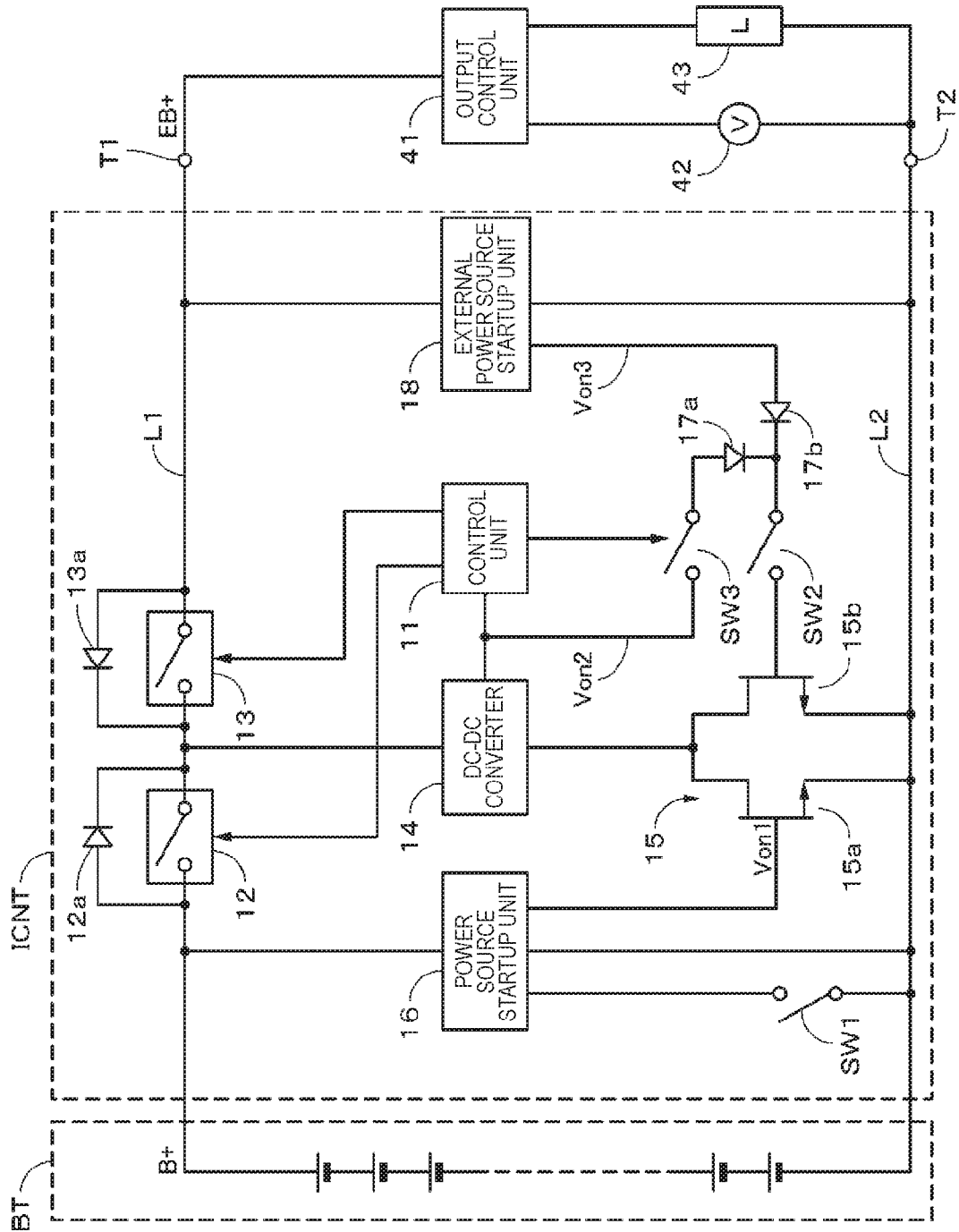
FIG. 4 is a block diagram of a first embodiment of the present disclosure.

An example of the specific configuration of the electricity storage device (string) will now be described with reference to FIG. 4. In FIG. 4, the illustration of the configuration for communication such as the communication channel line is omitted as appropriate. A battery unit BT in the electricity storage device is formed by, for example, 16 electricity storage modules MOD1 to MOD16 being connected. The number of connected electricity storage modules MOD is appropriately set in accordance with the use. Although illustration is omitted, a battery monitor that detects the voltage of each battery and calculates the state of charge (SOC) may be provided in the battery unit BT. Information such as the voltage value and SOC of the battery detected by the battery monitor may be supplied to a control unit 11 of the output controller ICNT.

The output controller ICNT, which is an example of the control device, is connected to the battery unit BT. The control unit 11 in the output controller ICNT is, for example, a microcomputer formed of a central processing unit (CPU). A not-illustrated read only memory (ROM), random access memory (RAM), etc. are connected to the control unit 11. The control unit 11 uses the RAM as a work memory, and performs control in accordance with the program stored in the ROM. The control unit 11 uses the information supplied from the battery monitor to perform various controls that manage the battery unit BT, for example.

A positive power source line L1 is disposed between the positive electrode side of the battery unit BT and a positive terminal for external output T1, and a negative power source line L2 is disposed between the negative electrode side of the battery unit BT and a negative terminal for external output T2. The terminal T1 and the terminal T2 are connected to the power line Lpw, and are connected in parallel to another string (illustration is omitted in FIG. 4) via the power line Lpw, as shown in FIG. 3. At least one of a power source 42 and a load 43 is connected to the power line Lpw via an output control unit 41 in the outside, for example. When the power source 42 is connected, the battery unit BT is charged by the power source 42. When the load 43 is connected, the electric power of the battery unit BT is supplied to the load 43.

The power source 42 is a direct current power source formed by rectifying the alternating current power of a power supply network (commercial power source), or is an electricity generating device utilizing renewable energy (a solar panel, a wind power generator, etc.). The load 43 is, for example, an electronic device in the home, and usually the direct current power of the electricity storage device is converted to alternating current power and supplied to the electronic device. The load 43 may be set as appropriate in accordance with the use of the electricity storage device. The output control unit 41 controls which of the power source 42 and the load 43 to connect to the terminals T1 and T2 (the power line Lpw).

For example, when a solar panel is used as the power source 42, the electricity generation amount fluctuates with the weather, time period, etc. Hence, in the daytime when the electricity generation amount of the solar panel is large, the battery of the battery unit BT of the electricity storage device is charged by the output of the solar panel, and the output from the solar panel is supplied to the load 43. In the nighttime, since the solar panel does not generate electricity, electric power is supplied to the load 43 from the battery of the battery unit BT of the electricity storage device. Such control is performed by the output control unit 41. However, this control is an example, and more complicated control may be performed, in which the power consumption amount of the load 43 is taken into consideration or the use of a commercial power source is combined.

A charging control switch 12 and a discharging control switch 13 are inserted into one of the positive power source line L1 and the negative power source line L2, for example into the positive power source line L1. As the switches, for example, a semiconductor switch of an insulated gate bipolar transistor (IGBT), a metal oxide semiconductor field effect transistor (MOSFET), or the like may be used. A diode 12a is connected in parallel to the charging control switch 12 in the forward direction with respect to the discharging current. A diode 13a is connected in parallel to the discharging control switch 13 in the forward direction with respect to the charging current.

Each of the charging control switch 12 and the discharging control switch 13 is set to ON or OFF by a control signal from the control unit 11. That is, the charging control switch 12 and the discharging control switch 13 are set ON during charging and discharging. At the time of stopping discharging, the discharging control switch 13 is set to OFF. At this time, a charging current is supplied to the battery of the battery unit BT via the diode 13a and the charging control switch 12; thus, charging is possible. At the time of stopping charging, the charging control switch 12 is set to OFF. At this time, a discharging current is supplied to the load 43 via the diode 12a and the discharging control switch 13. The charging control switch 12 and the discharging control switch 13 may be inserted into the negative power source line L2.

A power source voltage (e.g. +12 V) for operation is supplied to the control unit 11 from a DC-DC converter 14, which is an example of the control power source unit. An input voltage is supplied to the DC-DC converter 14 from the power source line L1 between the charging control switch 12 and the discharging control switch 13. Therefore, to the DC-DC converter 14, not only the voltage from the battery unit BT but also the voltage EB+ from the power source 42 connected to the terminals T1 and T2 can be inputted.

The DC-DC converter 14 generates, in the operating state, a power source voltage that operates the control unit 11 from the voltage supplied to the DC-DC converter 14. The DC-DC converter 14 supplies the generated power source voltage to the control unit 11. When the DC-DC converter 14 is in the non-operating state, that is, in the state where the DC-DC converter 14 does not operate, the power source voltage is not supplied to the control unit 11. The minus side of the DC-DC converter 14 is connected to the negative power source line L2 via a control switch 15. The control power source unit is not limited to DC-DC converters, and other configurations such as series regulators are possible.

The control switch 15, which is an example of the power source control circuit, is composed of, for example, two switching elements 15a and 15b. The switching element 15a and the switching element 15b are formed of, for example, a MOSFET, an IGBT, or the like. Each of the switching element 15a and the switching element 15b operates by a voltage not less than the threshold being applied to its gate. The threshold may be set as appropriate; for example, is set to 6 V. The thresholds of the operating voltages of the switching element 5a and the switching element 5b may be set to different values.

The control switch 15 controls the operating state of the DC-DC converter 14. For example, the DC-DC converter 14 is set in the operating state in a first state of the control switch 15, and the DC-DC converter 14 is set in the non-operating state in a second state of the control switch 15. Here, the first state of the control switch 15 is, for example, a state where at least one of the switching element 15a and the switching element 15b is ON. The second state is, for example, a state where both of the switching element 15a and the switching element 15b are OFF. The configuration of the control switch 15 may be altered as appropriate, and the first and second states may be appropriately set in accordance with the configuration of the control switch 15.

To the switching element 15a of the control switch 15, a voltage Von1 is supplied as a control signal from a power source startup unit 16. The power source startup unit 16 is connected to the power source line L1 between the positive electrode side of the battery unit BT and the charging control switch 12, and the minus side is connected to the negative power source line L2. That is, the voltage from the battery of the battery unit BT is supplied to the power source startup unit 16. The power source startup unit 16 generates a voltage Von1 as a control signal corresponding to the voltage of the battery unit BT, and the generated Von1 is supplied to the switching element 15a.

The power source startup unit 16 is further connected to the negative power source line L2 via a switch SW1. The switch SW1 becomes ON/OFF in accordance with the operation of starting up or shutting down the electricity storage device. For example, the switch SW1 becomes OFF upon starting up the electricity storage device, and becomes ON upon shutting down the electricity storage device. In accordance with the ON/OFF of the switch SW1, the voltage from the battery of the battery unit BT is supplied or stopped to the power source startup unit 16. For example, when the switch SW1 is OFF, the voltage from the battery of the battery unit BT is supplied to the power source startup unit 16; and when the switch SW1 is ON, the supply of the voltage from the battery unit BT is stopped to the power source startup unit 16.

To the switching element 15b of the control switch 15, a voltage Von2 as a control signal is supplied via a switch SW3, a diode 17a, and a switch SW2. The voltage Von2 is a voltage outputted by the DC-DC converter 14. The voltage Von2 is a second control signal for setting the switching element 15b to ON to set the DC-DC converter 14 in the operating state continuously.

The switch SW2 becomes ON/OFF in accordance with the operation of starting up or shutting down the electricity storage device, and is linked to the ON/OFF of the switch SW1. The switch SW1 and the switch SW2 may become ON/OFF independently. For example, the switch SW2 becomes ON at the time of starting up the electricity storage device, and becomes OFF at the time of shutting down the electricity storage device. By the setting of the switch SW2 to OFF, the electricity storage device can be shut down safely and surely.

The switch SW3 is a switch that is ON/OFF-controlled by the control unit 11. The switch SW3 is, for example, OFF when the electricity storage device is in the shutdown state. When the electricity storage device has started up and the control unit 11 has operated, the switch SW3 is set to ON by the control of the control unit 11.

The switching element 15b is configured to, when the switching element 15a cannot be set to ON by the power source startup unit 16 due to a small remaining capacity of the battery unit BT, be set to ON by the voltage of an external power source.

When the electricity storage device is started up, the switch SW1 becomes OFF, and the switch SW2 becomes ON. Here, when the remaining capacity of the battery unit BT is small, the voltage Von1 cannot be formed by the power source startup unit 16, and the switching element 15a does not become ON. Since the switching element 15a does not become ON, the DC-DC converter 14 does not enter the operating state. Hence, when the voltage EB+ is applied via the terminal T1 and the terminal T2 (the power line Lpw), a voltage Von3 is generated by an external power source startup unit 18. The voltage Von3 is a first control signal, and sets the switching element 15b to ON to set the DC-DC converter 14 in the operating state for a relatively small time.

The voltage Von3 is supplied to the switching element 15b via a diode 17b. The diode 17b and the diode 17a described above form an OR circuit. When a high-level signal is inputted to either one of the diode 17a and the diode 7b, the high-level signal is supplied to the switch SW2.

At the time of the startup of the electricity storage device, since the switch SW3 has been set OFF, it is assessed whether a high-level signal has been supplied via the diode 17b or not. Since the switch SW2 has been set to ON at the time of startup, a high-level signal is supplied to the switching element 15b via the switch SW2. The switching element 15b is set to ON by the supplied high-level signal.

By the setting of the switching element 15b to ON, a voltage is generated on the primary side of the DC-DC converter 14, and the DC-DC converter 14 enters the operating state. The voltage generated on the primary side of the DC-DC converter 14 is supplied to the secondary side of the DC-DC converter 14. The voltage supplied to the secondary side is supplied to the control unit 11 as a power source voltage. The control unit 11 operates in accordance with the supplied power source voltage. The control unit 11 sets the charging control switch 12 to ON, for example. By the setting of the charging control switch 12 to ON, the battery unit BT can be charged by the voltage from the power source 42.

Thus, even when the remaining capacity of the battery unit BT is small, the switching element 15b can be set to ON using the voltage EB+ supplied from the outside via the terminal T1 and the terminal T2, and the DC-DC converter 14 can be set to the operating state.

The external power source startup unit 18 described above is configured to detect the edge of the moment when an appropriate voltage EB+ is applied to the external terminal and to output a control signal for startup (the voltage Von3). After startup, when the control unit 11 has assessed that there is some problem with the battery unit BT of the electricity storage device, it is possible to shut down only the electricity storage device in question regardless of the presence or absence of the power source 42. When a configuration in which an electricity storage device is started up by detecting the presence of the external voltage EB+ is employed, in an electricity storage system in which another electricity storage device is connected in parallel as shown in FIG. 3, a problem that the latter electricity storage device cannot be shut down occurs because the state where the voltage EB+ is applied continues. Consequently, a situation where the battery unit BT of the electricity storage device enters an overdischarging state may occur. In a first embodiment of the present disclosure, the problem can be avoided because the voltage Von3 is outputted only at the moment when the external power source startup unit 18 has detected the voltage EB+.

Startup Operation of the Electricity Storage Device

Figure 5:
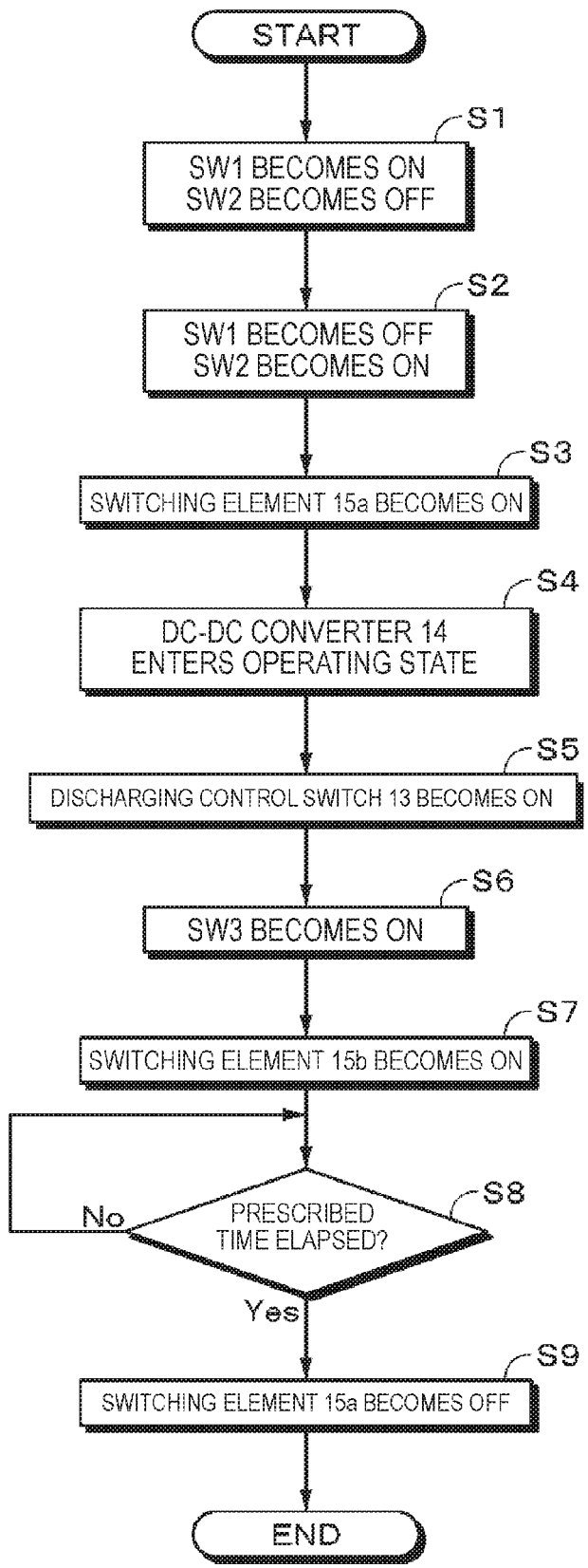
FIG. 5 is a flow chart showing an example of the processing at the time of the startup of the electricity storage system.

An example of the startup operation performed using the voltage of the battery unit BT of the electricity storage device will now be described with reference to the flow chart of FIG. 5. In a state where the power source of the electricity storage device is OFF, for example, the switch SW1 is set in the state of ON, the switch SW2 OFF, and the switch SW3 OFF. Furthermore, the charging control switch 12 and the discharging control switch 13 are set OFF, for example.

In step S1, the power source of the electricity storage device is set to ON, and the electricity storage device is started up. The setting of the power source of the electricity storage device to ON is performed by, for example, an operating unit such as a switch being operated by a user. Not limited to a user's operation, the power source of the electricity storage device may be set to ON automatically. When the power source of the electricity storage device is set to ON, the processing goes to step S2.

In step S2, the switch SW1 becomes OFF in accordance with the operation of setting the power source of the electricity storage device to ON. The switch SW2 becomes ON in conjunction with the OFF of the switch SW1. Then, the processing proceeds to step S3.

When the switch SW1 has become OFF, the voltage Von1 is applied to the gate of the switching element 15a, and the switching element 15a becomes ON. Then, the processing proceeds to step S4.

In step S4, by the entry of the switching element 15a into ON, a voltage is generated on the primary side of the DC-DC converter 14, and the DC-DC converter 14 enters the operating state. The voltage generated on the primary side of the DC-DC converter 14 is supplied to the secondary side, and the supplied voltage is supplied to the control unit 11 as a power source voltage. By the supplied power source voltage, the control unit 11 operates. Then, the processing proceeds to step S5.

In step S5, the discharging control switch 13 is set to ON by the control unit 11. By the setting of the discharging control switch 13 to ON, the voltage of the battery unit BT is generated between the connection point between the discharging control switch 13 and the terminal T1, and the negative power source line L2. Furthermore, Von2 is formed as a control signal from the secondary side of the DC-DC converter 14. Then, the processing proceeds to step S6.

In step S6, the switch SW3 is set to ON by the control unit 11. By the setting of the switch SW3 to ON, the voltage Von2 is supplied to the gate of the switching element 15b via the switch SW3 and the switch SW2. The voltage Von2 is, for example, 15 V. Then, the processing proceeds to step S7.

In step S7, by the supply of the voltage Von2 to the gate, the switching element 15b becomes ON. By the entry of the switching element 15b into ON, the voltage of the battery unit BT is supplied to the DC-DC converter 14 even when the switching element 15a has become OFF. That is, by the supply of the voltage Von2 to the switching element 15b and the entry of the switching element 15b into ON, the operating state of the DC-DC converter 14 is maintained. Then, the processing proceeds to step S8.

In step S8, it is assessed whether a prescribed time has elapsed or not. When the prescribed time has not elapsed, the processing returns to step S8, and the processing of step S8 is repeated. When the prescribed time has elapsed, the processing proceeds to step S9.

In step S9, the switching element 15a becomes OFF. When the prescribed time has elapsed, the level of the voltage Von1 supplied to the gate of the switching element 15a becomes below the threshold, and the switching element 15a becomes OFF. Even when the switching element 15a has become OFF, the operating state of the DC-DC converter 14 is maintained because the switching element 15b is ON.

Shutdown Operation of the Electricity Storage Device

Figure 6:
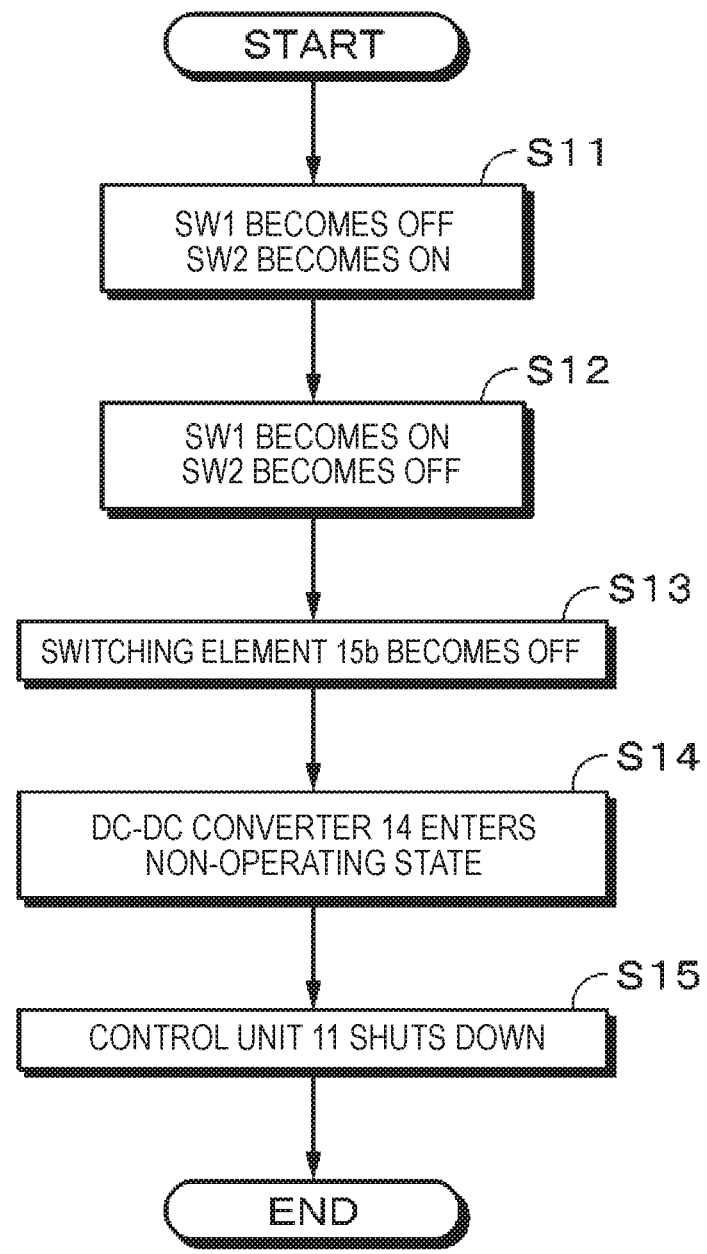
FIG. 6 is a flow chart showing an example of the processing at the time of the shutdown of the electricity storage system.

Next, the shutdown operation of the electricity storage device is described with reference to the flow chart of FIG. 6. In step S11, the power source of the electricity storage device is set to OFF, and the electricity storage device is shut down. The setting of the power source of the electricity storage device to OFF is performed by, for example, an operating unit such as a switch being operated by a user. Not limited to a user's operation, the power source of the electricity storage device may be set to OFF automatically. When the power source of the electricity storage device is set to OFF, the processing proceeds to step S12.

In step S12, by the setting of the electricity storage device to OFF, the switch SW1 becomes ON. The switch SW2 becomes OFF in conjunction with the entry of the switch SW1 into ON. When the switch SW1 has already been set ON in step S12, only the setting of the switch SW2 to OFF is performed. The processing proceeds to step S13.

In step S13, the switching element 15b becomes OFF. That is, by the setting of the switch SW2 to OFF in step S12, the supply of the voltage Von2 to the switching element 15b is stopped, and the switching element 15b becomes OFF. Here, as described above, the switching element 15a has become OFF after the lapse of a prescribed time from when the electricity storage device had started up. Therefore, the switching element 15a and the switching element 15b enter the state of OFF. The processing proceeds to step S14.

In step S14, since the switching element 15a and the switching element 15b become OFF, the DC-DC converter 14 enters the non-operating state. By the entry of the DC-DC converter 14 into the non-operating state, the supply of the power source voltage from the DC-DC converter 14 to the control unit 11 is stopped. Then, the processing proceeds to step S15.

In step S15, by the stop of the supply of the power source voltage from the DC-DC converter 14, the operation of the control unit 11 stops. Before the stop of the operation of the control unit 11, the charging control switch 12, the discharging control switch 13, and the switch SW3 may be set to OFF by the control of the control unit 11.

As described above, even when there is no external power source, the DC-DC converter 14 can be started up by the voltage of the battery unit BT included in the electricity storage device, and the control unit 11 can be operated. In the first embodiment, when the voltage of the battery unit BT has fallen and the switching element 15a cannot be set to ON by the power source startup unit 16, the switching element 15b can be set to ON by the voltage Von3 of the external power source startup unit 18.

Example of the External Power Source Startup Unit

Figure 7:
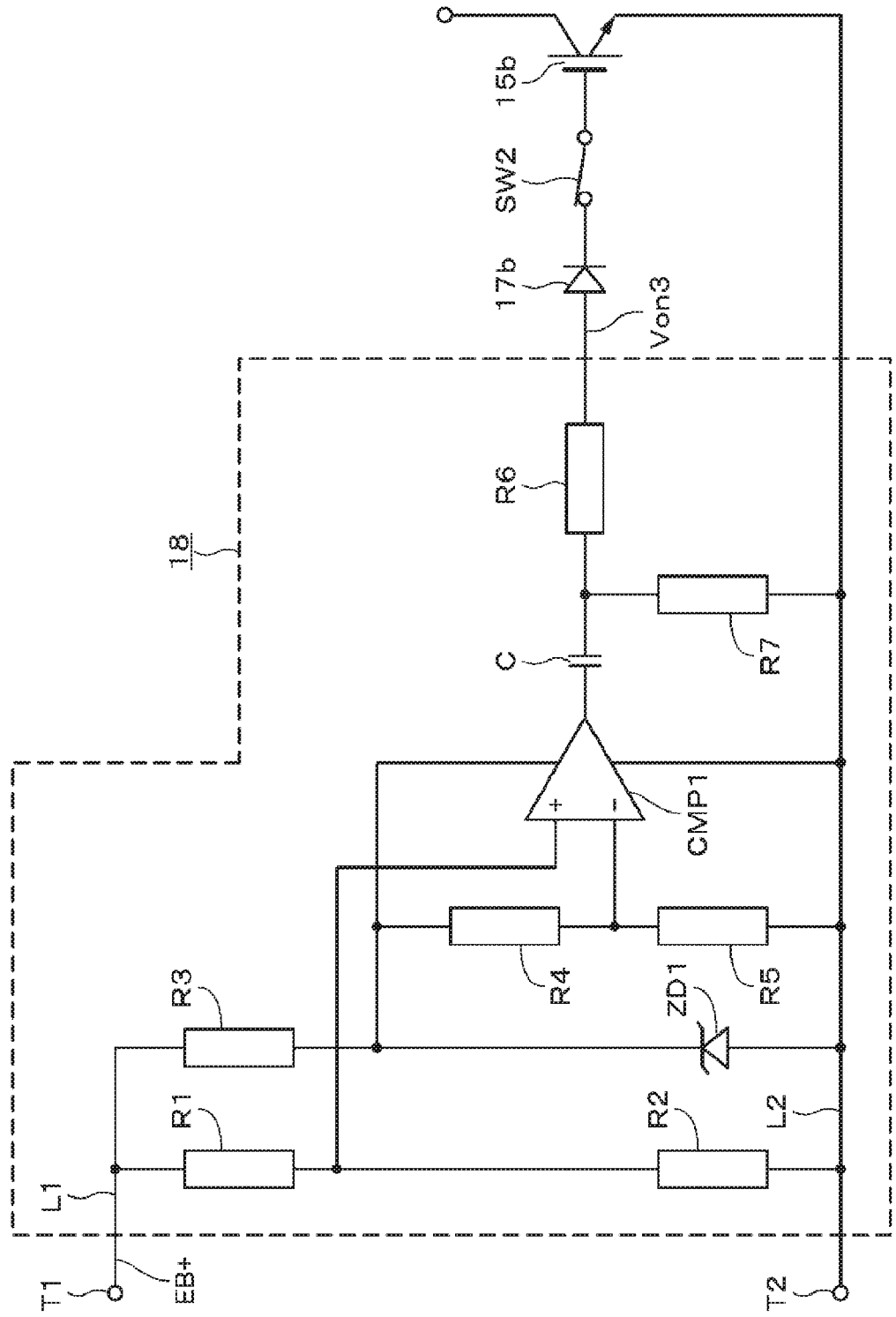
FIG. 7 is a connection diagram of an example of an external power source startup unit.

An example of the external power source startup unit 18 will now be described with reference to FIG. 7. An external power source (voltage EB+) is applied between the terminals T1 (the positive power source line L1) and T2 (the negative power source line L2). A series circuit of resistances R1 and R2 and a series circuit of a resistance R3 and a Zener diode ZD1 are connected between the lines L1 and L2.

The voltage of a connection point between the resistances R1 and R2 is supplied to the plus-side input terminal of a comparator CMP1. The voltage of a connection point between the resistance R3 and the Zener diode ZD1 is supplied to the plus-side power source terminal of the comparator CMP1. The minus-side power source terminal of the comparator CMP1 is connected to the line L2. The voltage generated in the Zener diode ZD1 is supplied to a series circuit of resistances R4 and R5, and the voltage of a connection point between the resistances R4 and R5 is supplied to the minus-side input terminal of the comparator CMP1.

The values of the resistances R1 to R5 and the Zener voltage of the Zener diode ZD1 are selected to appropriate values. When the voltage EB+ from the outside is an appropriate value, the comparator CMP1 generates a high-level output. That is, at the moment when the electricity storage device is connected to the power line Lpw to which another electricity storage device is connected, the voltage EB+ rises, and the output of the comparator CMP1 rises from a low level to a high level. If the voltage EB+ is smaller than the appropriate value, the output of the comparator CMP1 does not rise to a high level.

The output of the comparator CMP1 is supplied to the control electrode of the switching element 15b (e.g. an IGBT) via a capacitor C, a resistance R6, the diode 17b, and the switch SW2. In FIG. 7, the diode 17a is omitted.

Since a configuration of an alternating current coupling by means of the capacitor C is employed, the positive voltage Von3 is generated only at the moment when the output of the comparator CMP1 rises from a low level to a high level. The switching element 15b becomes ON due to the voltage Von3. Therefore, the DC-DC converter 14 to which the switching element 15b is connected enters the operating state, and the electricity storage device starts up. A capacitor etc. may be added so as to widen the pulse width of the positive voltage Von3 generated at the rising edge.

The Von3 outputted from the external power source startup unit 18 becomes a low level in a short time, such as in several seconds. As described above, when the DC-DC converter 14 has entered the operating state, the control unit 11 enters the operating state, and the switch SW3 is set to ON. The voltage Von2 (the second control signal) outputted from the DC-DC converter 14 via the switch SW3 is supplied to the switching element 15b via the diode 17a and the switch SW2. Therefore, the ON state of the switching element 15b continues.

2. Modification Example of the First Embodiment

In the first embodiment, a relatively high voltage (e.g. 800 V) is applied to the power line Lpw. Although illustration is omitted in FIG. 4, the communication channel line Lcom is connected to the control unit 11. The communication channel line Lcom may be generally connected to/separated from the control unit main body by a human hand. Therefore, it is preferable in terms of safety that the control unit 11 be insulated from the high voltage side.

Figure 8:
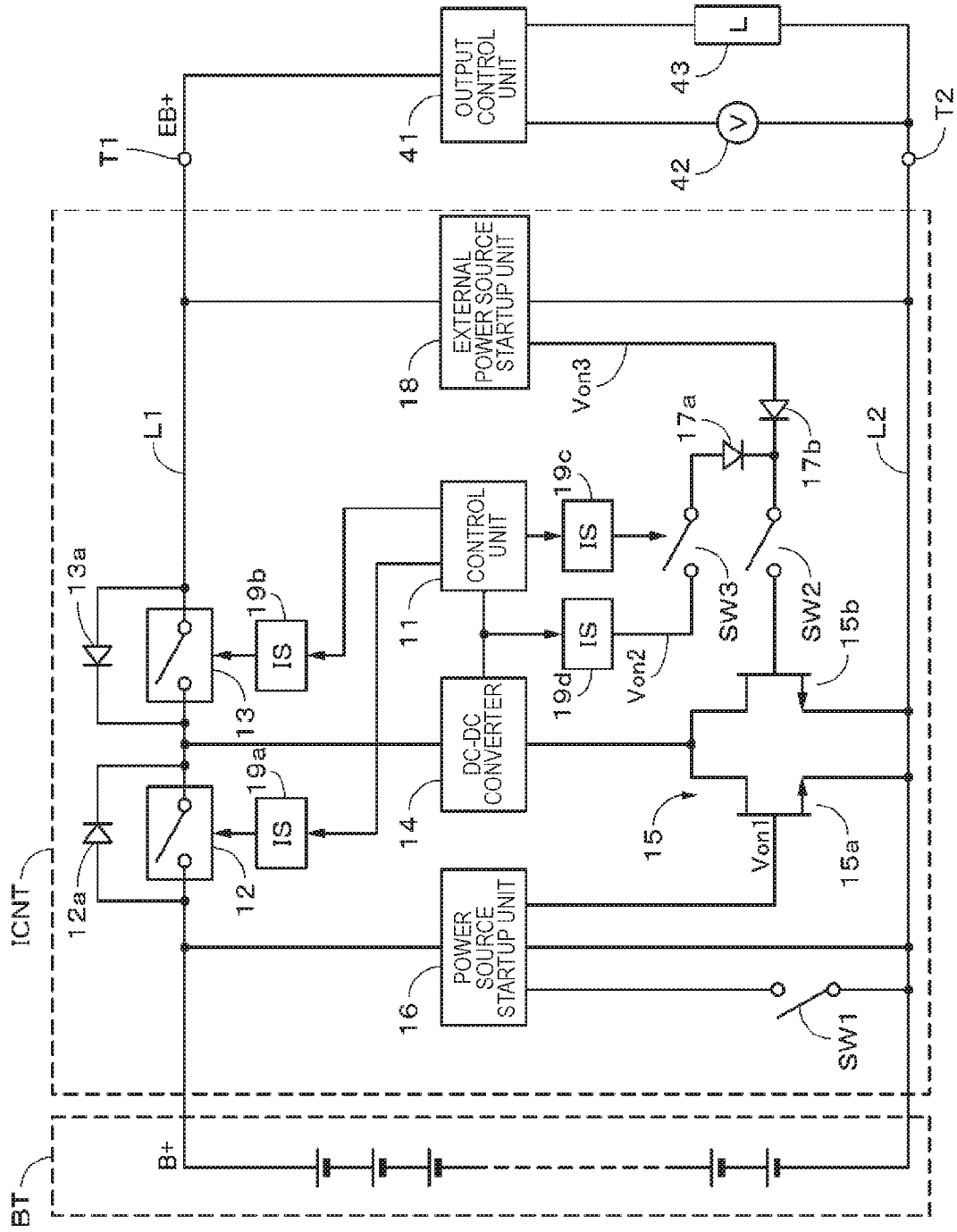
FIG. 8 is a block diagram showing a modification example of the first embodiment.

As shown in FIG. 8, an insulating unit 19a is inserted between the control unit 11 and the charging control switch 12, and an insulating unit 19b is inserted between the control unit 11 and the discharging control switch 13. An insulating unit 19c and an insulating unit 19d are inserted between the control unit 11 and the switch SW3. Since the primary side (high voltage side) and the secondary side (low voltage side) of the DC-DC converter 14 are insulated from each other on the inside of them, there is no need to provide an insulating unit on the outside. Thus, by insulating the control unit 11 from the high voltage side, safety can be enhanced. As the insulating units 19a to 19d, a configuration using a photocoupler, a configuration using a transformer, etc. may be used.

3. Second Embodiment

Figure 9:
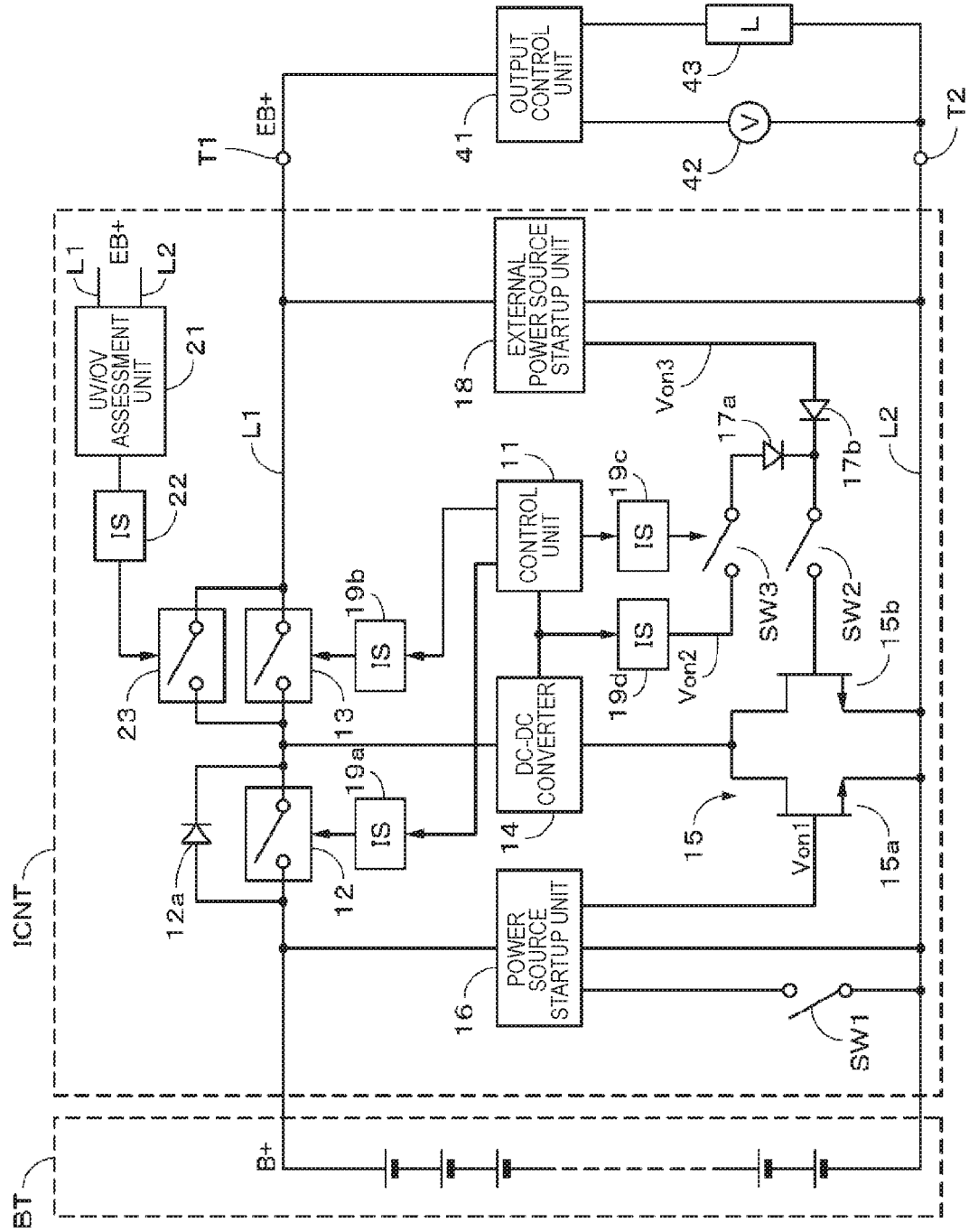
FIG. 9 is a block diagram of a second embodiment of the present disclosure.

When the external voltage EB+ described above is much higher than the appropriate value, the voltage is inputted to the DC-DC converter 14, and this is very dangerous. On the other hand, when the external voltage EB+ is lower than the appropriate value, startup at the low voltage may cause the system to be unstable. In the second embodiment, in view of this point, as shown in FIG. 9, the diode 13a that is controlled in parallel to the discharging control switch 13 is replaced with a switch 23, and the switch 23 is set to ON only when the voltage EB+ is a valued in the appropriate range.

The ON/OFF of the switch 23 is controlled by a control signal to which the detection output of a detection circuit 21 that detects an overvoltage and an undervoltage is supplied via an insulating unit 22. That is, when the detection circuit 21 has detected that the external voltage EB+ is not an appropriate value, the switch 23 is set to OFF; and when the EB+ is an appropriate value, the switch 23 is set to ON. Therefore, a voltage of an inappropriate value being applied to the DC-DC converter 14 can be prevented.

Figure 10:
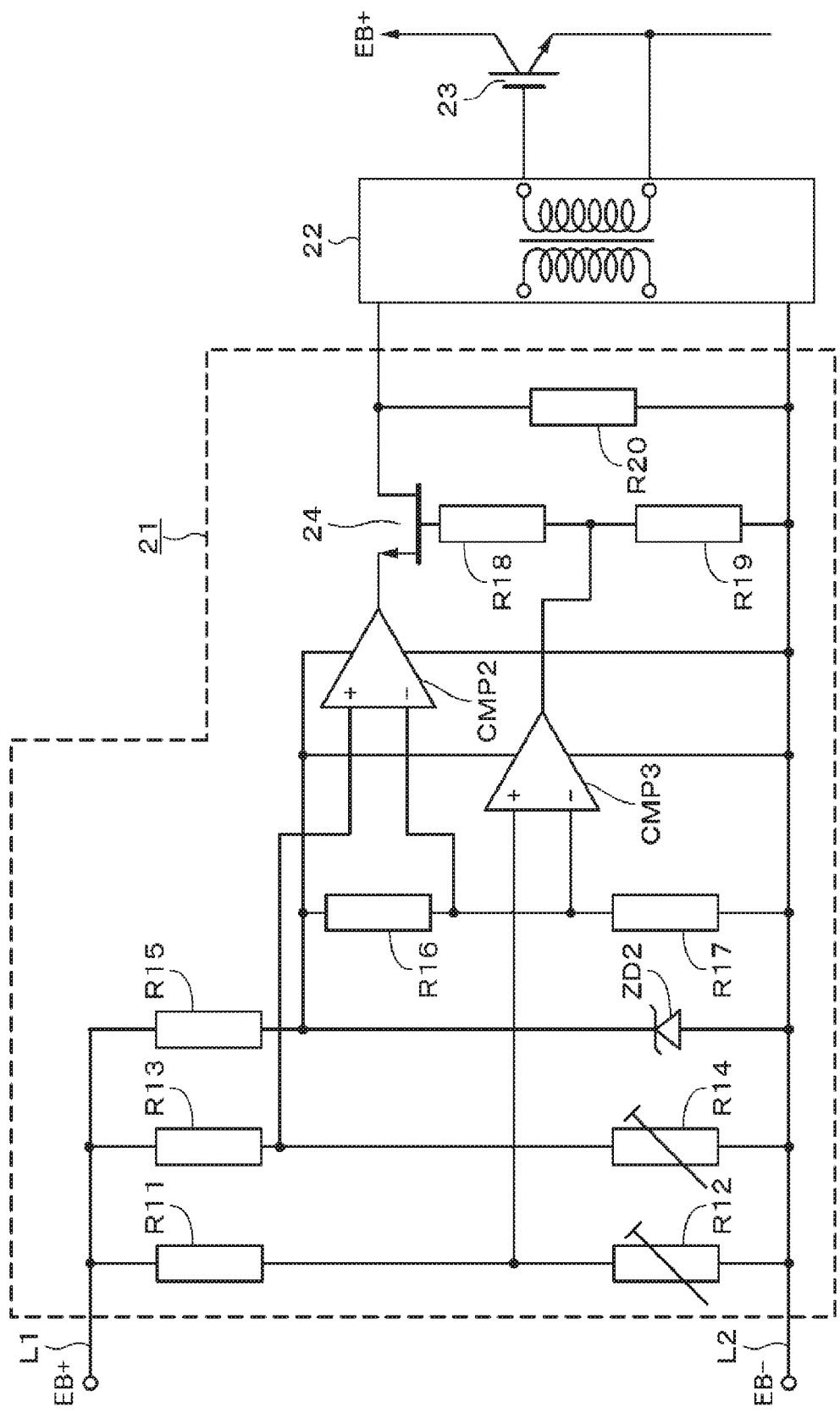
FIG. 10 is a connection diagram of an example of a detection circuit that detects an overvoltage and an undervoltage.

The detection circuit 21 has a configuration shown in FIG. 10, for example. A series circuit of resistances R11 and R12, a series circuit of resistances R13 and R14, and a series circuit of a resistance R15 and a Zener diode ZD2 are inserted between the lines L1 and L2 to which the external voltage EB+ is supplied. The resistances R12 and R14 are formed as a semi-fixed resistor, as necessary. A series circuit of resistances R16 and R17 is connected in parallel to the Zener diode ZD2.

A comparator CMP2 and a comparator CMP3 are provided. The voltage of a connection point between the resistances R13 and R14 is inputted to the plus-side input terminal of the comparator CMP2, and the voltage of a connection point between the resistances R16 and R17 is inputted to the minus-side input terminal of the comparator CMP2. The voltage of a connection point between the resistances R11 and R12 is inputted to the plus-side input terminal of the comparator CMP4, and the voltage of a connection point between the resistances R16 and R17 is inputted to the minus-side input terminal of the comparator CMP4. The Zener voltage generated in the Zener diode ZD2 is used as the power source voltage of each of the comparators CMP2 and CMP3.

The comparators CMP2 and CMP3 generate a high-level output when the voltage inputted to the plus-side input terminal is larger than the voltage inputted to the minus-side input terminal, and generates a low-level output in the other cases. The output of the comparator CMP2 is supplied to the source of a P-channel MOSFET 24. A series circuit of resistances R18 and R19 is inserted between the gate of the MOSFET 24 and the line L2. The output of the comparator CMP3 is supplied to a connection point between the resistances R18 and R19.

The source of the MOSFET 24 is connected to the line L2 via a resistance R20, and is inputted to the insulating unit 22. The insulating unit 22 is configured to make insulation using a transformer, for example. One end of the secondary coil of the transformer is connected to the gate of the IGBT forming the switch 23, and the other end of the secondary coil is connected to the emitter of the IGBT. When a prescribed voltage, for example +15 V, is applied between the gate and the emitter of the IGBT, the IGBT becomes ON. By connecting both ends of the secondary coil of the transformer individually to the gate and the emitter, a high voltage of several hundred volts can be switched using a low voltage, for example +15 V, as the voltage applied between the gate and the emitter of the IGBT.

In the detection circuit 21 described above, by appropriately setting the value of each resistance, when the voltage EB+ is an undervoltage, both of the outputs of the CMP2 and the CMP3 are made a low level. Therefore, the MOSFET 24 is OFF and the output of the MOSFET 24 is a low level, and the switch 23 (IGBT) is OFF. Therefore, the undervoltage being supplied to the DC-DC converter 14 is prevented.

When the voltage EB+ is an appropriate voltage, the output of the comparator CMP2 is a high level, and the output of the comparator CMP3 is a low level. Therefore, the MOSFET 24 becomes ON, and its output is a high level. The high level is supplied to the insulating unit 22, and the switch 23 (IGBT) becomes ON. Therefore, the appropriate voltage is supplied to the DC-DC converter 14, and the DC-DC converter 14 operates stably.

When the voltage EB+ is an overvoltage, both of the outputs of the comparator CMP2 and the comparator CMP3 become a high level. Therefore, the MOSFET 24 is OFF, and its output is a low level. Therefore, the switch 23 (IGBT) is OFF. Therefore, the possibility that the overvoltage will be supplied to the DC-DC converter 14 and the DC-DC converter 14 will get out of order can be prevented.

4. Modification Examples

Hereinabove, a plurality of embodiments of the present disclosure are described; but the present disclosure is not limited to the embodiments described above, and various modifications are possible. The types of the circuit elements, the characteristics such as the resistance values of the circuit elements, and the arrangement of the circuit elements in the embodiments etc. described above are only examples, and may be altered as appropriate without departing from the spirit of the present disclosure.

The sequence of the processings described above in the present disclosure may be altered as appropriate to the extent that technical contradiction does not occur. For example, in FIG. 6, the sequence of the processings of step S5 and step S6 may be opposite, or the processings may be performed parallel.

5. Application Examples

Application examples of the electricity storage device will now be described. The application example of the electricity storage device is not limited to the application examples described below.

Electricity Storage Device in a House as an Application Example

Figure 11:
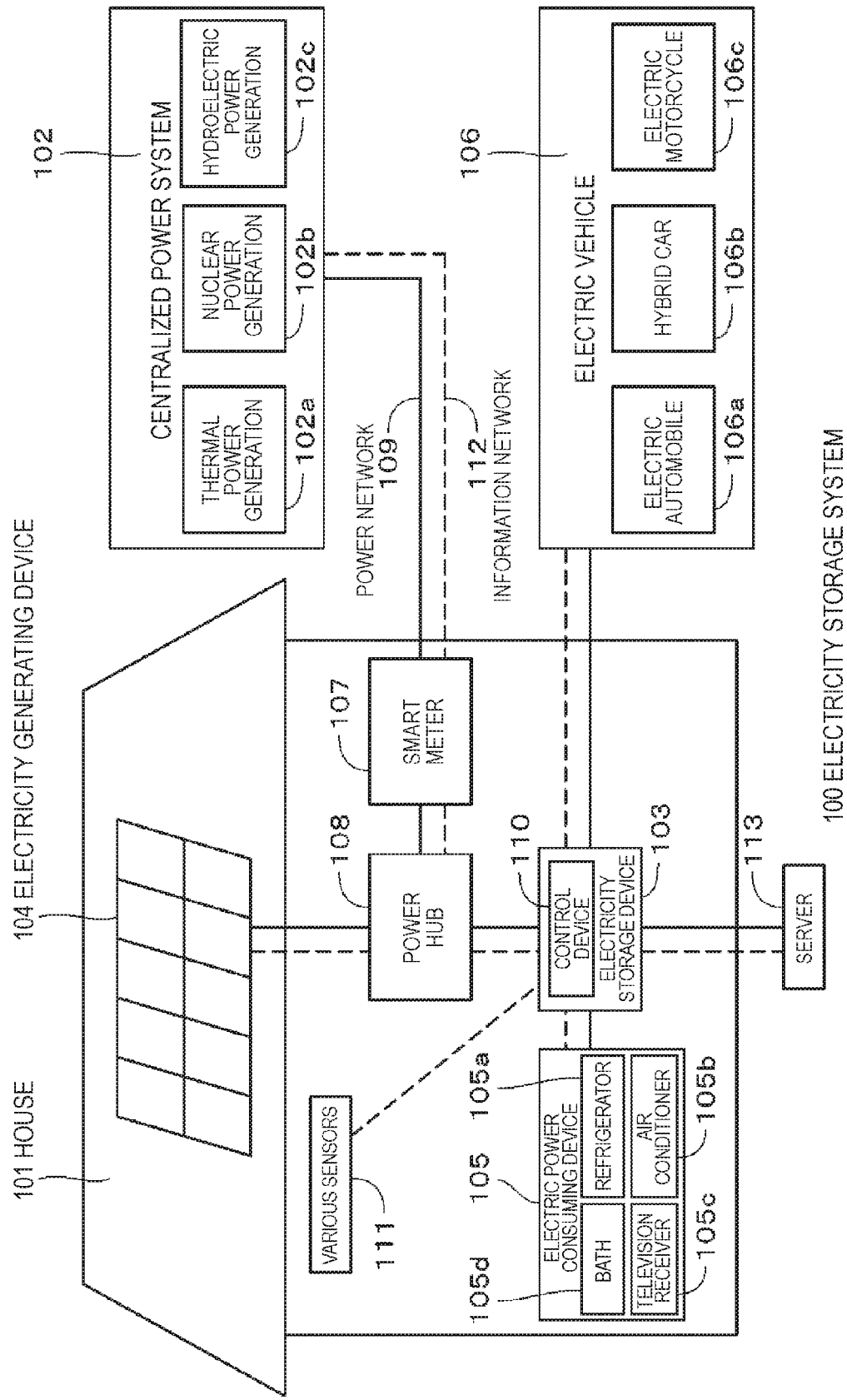
FIG. 11 is a block diagram for describing an application example of the electricity storage system in the present disclosure.

An example in which the present disclosure is applied to an electricity storage device for houses will now be described with reference to FIG. 11. For example, in an electricity storage device 100 for a house 101, electric power is supplied to an electricity storage device 103 from a centralized power system 102 of thermal power generation 102a, nuclear power generation 102b, hydroelectric power generation 102c, etc. via a power network 109, an information network 112, a smart meter 107, a power hub 108, etc. Together with this, electric power is supplied to the electricity storage device 103 from an independent power source such as a home electricity generating device 104. The electric power supplied to the electricity storage device 103 is stored. The electric power to be used in the house 101 is supplied using the electricity storage device 103. Similar electricity storage devices can be used not only in the house 101 but also in large buildings.

The house 101 is provided with the electricity generating device 104, an electric power consuming device 105, the electricity storage device 103, a control device 110 that controls each device, the smart meter 107, and sensors 111 that acquire various kinds of information. Each device is connected by the power network 109 and the information network 112. A solar cell, a fuel cell, a windmill, etc. are used as the electricity generating device 104, and the generated electric power is supplied to the electric power consuming device 105 and/or the electricity storage device 103. The electric power consuming device 105 is a refrigerator 105a, an air conditioner 105b, a television receiver 105c, a bath 105d, etc. Also an electric vehicle 106 is included in the electric power consuming device 105. The electric vehicle 106 is an electric automobile 106a, a hybrid car 106b, and an electric motorcycle 106c. The electric vehicle 106 may be also an electric assisted bicycle etc.

The electricity storage device 103 is formed of a secondary battery or a capacitor. For example, it is formed of a lithium ion secondary battery. The lithium ion secondary battery may be of a stationary type or one used in the electric vehicle 106. The electricity storage device of the present disclosure described above may be used for the electricity storage device 103. One or a plurality of electricity storage devices may be used. The smart meter 107 has a function of detecting the amount of use of the commercial power and transmitting the detected amount of use to the electric power company. For the power network 109, one or a plurality of direct current power supply, alternating current power supply, and non-contact power supply may be combined.

The various sensors 111 are, for example, a human sensor, an illuminance sensor, an object detection sensor, a power consumption sensor, a vibration sensor, a contact sensor, a temperature sensor, an infrared sensor, etc. The information acquired by the various sensors 111 is transmitted to the control device 110. By the information from the sensors 111, the weather conditions, human conditions, etc. can be grasped, and the electric power consuming device 105 can be automatically controlled to minimize the energy consumption. The control device 110 can transmit information about the house 101 to the electric power company in the outside etc. via the Internet.

By the power hub 108, processing such as power line branching and direct current/alternating current conversion is performed. As the communication system of the information network 112 connected to the control device 110, a method using a communication interface such as a universal asynchronous receiver/transmitter (UART; a transmitting/receiving circuit for asynchronous serial communication) and a method using a sensor network based on a wireless communication standard such as Bluetooth (registered trademark), ZigBee, or Wi-Fi are given. The Bluetooth (registered trademark) system is applied to multimedia communication, and can perform communications of one-to-many connection. ZigBee uses the physical layer of the Institute of Electrical and Electronics Engineers (IEEE) 802.15.4. The IEEE 802.15.4 is the name of a standard of a short distance wireless network called a personal area network (PAN) or a wireless (W) PAN.

The control device 110 is connected to a server 113 in the outside. The server 113 may be managed by any of the house 101, the electric power company, and a service provider. The information transmitted and received by the server 113 is, for example, power consumption information, life pattern information, power rates, weather information, natural disaster information, and information about power transactions. The information may be transmitted and received by a home electric power consuming device (e.g. a television receiver), or may be transmitted and received by a device outside the home (e.g. a mobile phone, etc.). The information may be displayed on a device having a display function, such as television receivers, mobile phones, and personal digital assistants (PDAs).

The control device 110 that controls each unit is formed of a CPU, a RAM, a ROM, etc., and is included in the electricity storage device 103 in this example. The control device 110 is connected to the electricity storage device 103, the home electricity generating device 104, the electric power consuming device 105, the various sensors 111, and the server 113 by the information network 112, and has a function of, for example, adjusting the amount of use of the commercial power and the electricity generation amount. In addition, the control device 110 may have a function of performing power transactions in the power market etc.

As described above, not only the electric power from the centralized power system 102 of the thermal power generation 102a, the nuclear power generation 102b, the hydroelectric power generation 102c, etc. but also the electric power generated by the home electricity generating device 104 (solar power generation and/or wind power generation) can be stored in the electricity storage device 103. Therefore, even when the electric power generated by the home electricity generating device 104 fluctuates, it is possible to perform control of keeping the electric power amount transferred to the outside constant or performing discharging only as much as needed. For example, the electricity storage device 103 can be used in a way that electric power obtained by solar power generation is stored in the electricity storage device 103 and also midnight power with low rates during night is stored in the electricity storage device 103, and the electric power stored by the electricity storage device 103 is discharged and used in the daytime period when the rate is high.

Although an example in which the control device 110 is included in the electric storage device 103 is described in this example, the control device 110 may be included in the smart meter 107 or may be formed independently. Furthermore, the electricity storage device 100 may be used for a plurality of households in an apartment house, or may be used for a plurality of detached houses.

Electricity Storage Device in a Vehicle as an Application Example

Figure 12:
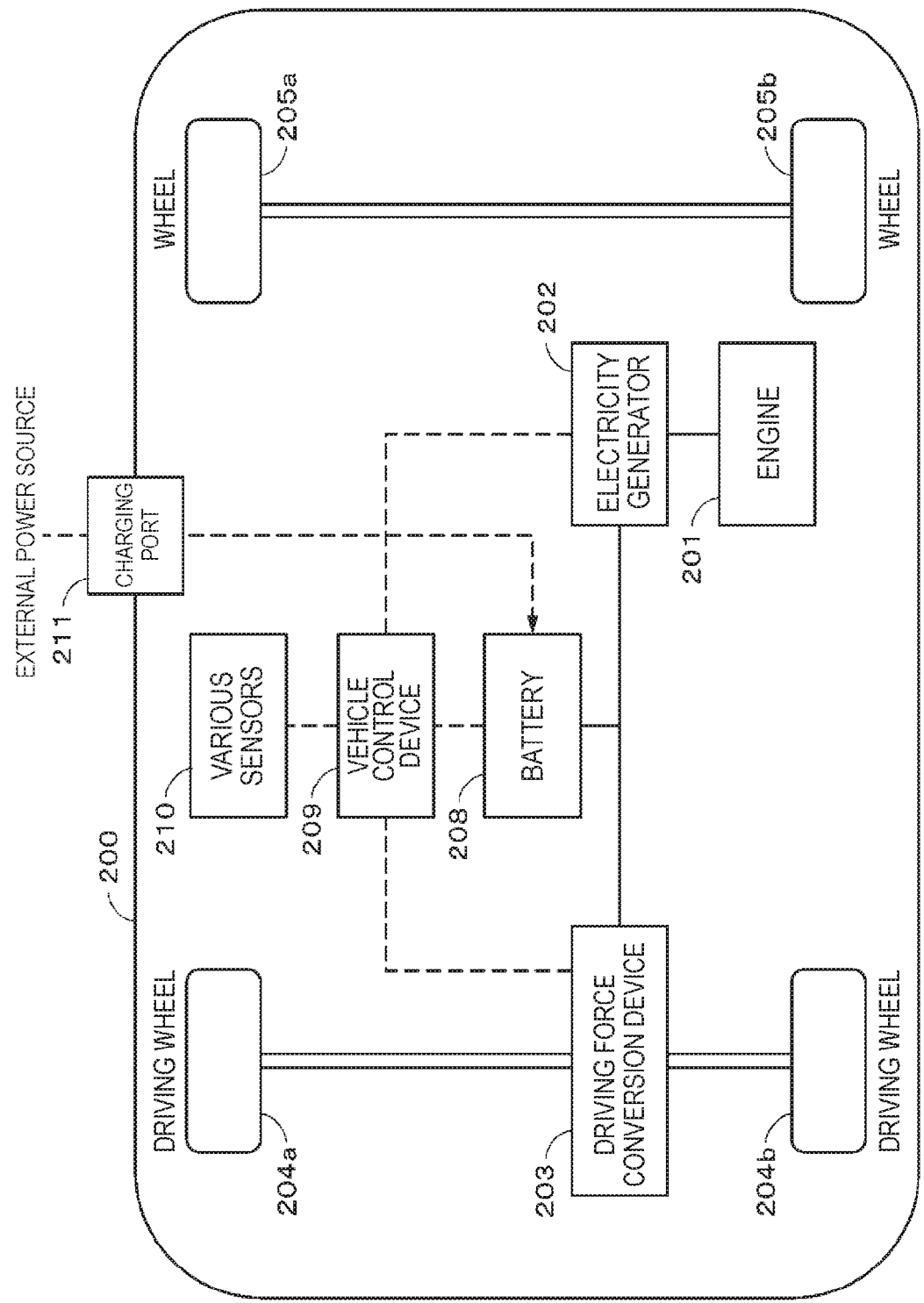
FIG. 12 is a block diagram for describing another application example of the electricity storage system in the present disclosure.

An example in which the present disclosure is applied to an electricity storage device for vehicles will now be described with reference to FIG. 12. In FIG. 12, an example of the configuration of a hybrid vehicle using a series hybrid system to which the present disclosure is applied is schematically shown. The series hybrid system is a car that runs with an electric power/driving force conversion device, using electric power generated by an electricity generator driven by an engine or electric power thus generated and temporarily stored in a battery.

A hybrid vehicle 200 of this example is mounted with an engine 201, an electricity generator 202, an electric power/driving force conversion device 203, a driving wheel 204a, a driving wheel 204b, a wheel 205a, a wheel 205b, a battery 208, a vehicle control device 209, various sensors 210, and a charging port 211. The electricity storage device of the present disclosure described above is used for the battery 208. One or a plurality of electricity storage devices are used.

The hybrid vehicle 200 runs with the electric power/driving force conversion device 203 as the motive power source. An example of the electric power/driving force conversion device 203 is a motor. The electric power/driving force conversion device 203 is put into operation by the electric power of the battery 208, and the rotational force of the electric power/driving force conversion device 203 is transmitted to the driving wheels 204a and 204b. Either an alternating current motor or a direct current motor may be used as the electric power/driving force conversion device 203 by using direct current-alternating current (DC-AC) or the reverse conversion (AC-DC conversion) in a necessary place. The various sensors 210 control the engine speed and control the degree of opening of a not-illustrated throttle valve (throttle opening degree), via the vehicle control device 209. A speed sensor, an acceleration sensor, an engine speed sensor, etc. are included in the various sensors 210.

The rotational force of the engine 201 is transmitted to the electricity generator 202, and the electric power generated by the electricity generator 202 using the rotational force can be stored in the battery 208.

When the speed of the hybrid vehicle is reduced by a not-illustrated braking mechanism, the resistance force at the time of the speed reduction is applied to the electric power/driving force conversion device 203 as rotational force, and the regenerative electric power generated by the electric power/driving force conversion device 203 using the rotational force is stored in the battery 208.

The battery 208 can be connected to a power source outside the hybrid vehicle to receive electric power supply from the power source in the outside via the charging port 211 as the input port, and can store the received electric power.

Although not illustrated, an information processing device that performs information processing regarding vehicle control on the basis of information about the secondary battery may be provided. As such an information processing device, for example, an information processing device that performs remaining battery power display on the basis of information about the remaining battery power etc. are given.

In the above, a description is given using, as an example, a series hybrid car, which runs on a motor using electric power generated by an electricity generator driven by an engine or electric power thus generated and temporarily stored in a battery. However, the present disclosure can be effectively applied also to parallel hybrid cars, in which both of the outputs of an engine and a motor are used as driving sources and three modes of running only on the engine, running only on the motor, and running on the engine and the motor are switched as appropriate for use. Moreover, the present disclosure can be effectively applied also to what is called electric vehicles, which run by driving based only on a drive motor without using an engine.

Additionally, the present technology may also be configured as below.

(1)

An electricity storage device including:

a first external terminal and a second external terminal for connection to an outside;

an electricity storage unit capable of being charged and discharged;

a first power source line disposed between a positive electrode side of the electricity storage unit and the first external terminal;

a second power source line disposed between a negative electrode side of the electricity storage unit and the second external terminal;

a power source circuit connected to both the first and second power source lines and configured to supply an output voltage to a control circuit in an operating state;

a power source control circuit configured to control an operating state and a non-operating state of the power source circuit;

a first control signal generation circuit configured to supply a first control signal corresponding to transition of an external voltage applied to the first external terminal and the second external terminal to the power source control circuit to set the power source circuit in an operating state for a prescribed time; and a second control signal generation circuit configured to generate a second control signal that allows the power source circuit to be set in an operating state continuously by the control circuit to which an output voltage of the power source circuit is supplied.

(2)

The electricity storage device according to (1), wherein the first control signal generation circuit includes a comparator configured to compare the external voltage to a reference voltage, and a differentiating circuit configured to differentiate an output of the comparator outputted when the external voltage is larger than the reference voltage.

(3)

The electricity storage device according to any of (1) and (2), wherein an insulating circuit is disposed between the control circuit and a portion of a high voltage.

(4)

The electricity storage device according to any of (1), (2), and (3), wherein a switch element is inserted into a supply path of the external voltage to the power source circuit, and the external voltage is supplied to the power source circuit via the switch element only when a value of the external voltage is in an appropriate range.

(5)

An electricity storage system in which a plurality of electricity storage devices are connected, wherein each of the electricity storage devices includes a first external terminal and a second external terminal for connection to an outside, an electricity storage unit capable of being charged and discharged, a first power source line disposed between a positive electrode side of the electricity storage unit and the first external terminal, a second power source line disposed between a negative electrode side of the electricity storage unit and the second external terminal, a power source circuit connected to both the first and second power source lines and configured to supply an output voltage to a control circuit in an operating state, a power source control circuit configured to control an operating state and a non-operating state of the power source circuit, a first control signal generation circuit configured to supply a first control signal corresponding to transition of an external voltage applied to the first external terminal and the second external terminal to the power source control circuit to set the power source circuit in an operating state for a prescribed time, and a second control signal generation circuit configured to generate a second control signal that allows the power source circuit to be set in an operating state continuously by the control circuit to which an output voltage of the power source circuit is supplied.

(6)

A method for controlling an electricity storage device, the electricity storage device including a first external terminal and a second external terminal for connection to an outside, an electricity storage unit capable of being charged and discharged, a first power source line disposed between a positive electrode side of the electricity storage unit and the first external terminal, a second power source line disposed between a negative electrode side of the electricity storage unit and the second external terminal, a power source circuit connected to both the first and second power source lines and configured to supply an output voltage to a control circuit in an operating state, and a power source control circuit configured to control an operating state and a non-operating state of the power source circuit, the method including:

generating a first control signal corresponding to transition of an external voltage applied to the first external terminal and the second external terminal and supplying the first control signal to the power source control circuit to set the power source circuit in an operating state for a prescribed time; and generating a second control signal by the control circuit and using the second control signal to set the power source circuit in an operating state continuously.

REFERENCE SIGNS LIST

11 control unit
14 DC-DC converter
15 control switch
15*a* switching element 15b switching element
16 power source startup unit
18 external power source startup unit
19a to 19d, 22 insulating unit
21 detection circuit that detects an overvoltage and an undervoltage
T1 positive terminal
T2 negative terminal
L1 positive power source line
L2 negative power source line

The invention claimed is:

1. An electricity storage device comprising:
a first external terminal and a second external terminal for connection to an outside;
an electricity storage unit capable of being charged and discharged;
a first power source line disposed between a positive electrode side of the electricity storage unit and the first external terminal;
a second power source line disposed between a negative electrode side of the electricity storage unit and the second external terminal;
a power source circuit connected to both the first and second power source lines and configured to supply an output voltage to a control circuit in an operating state;
a power source control circuit configured to control an operating state and a non-operating state of the power source circuit;
a first control signal generation circuit configured to supply a first control signal corresponding to transition of an external voltage applied to the first external terminal and the second external terminal to the power source control circuit to set the power source circuit in an operating state for a prescribed time; and
a second control signal generation circuit configured to generate a second control signal that allows the power source circuit to be set in an operating state continuously by the control circuit to which an output voltage of the power source circuit is supplied.

2. The electricity storage device according to claim 1, wherein the first control signal generation circuit includes
a comparator configured to compare the external voltage to a reference voltage, and
a differentiating circuit configured to differentiate an output of the comparator outputted when the external voltage is larger than the reference voltage.

3. The electricity storage device according to claim 1, wherein an insulating circuit is disposed between the control circuit and a portion of a high voltage.

4. The electricity storage device according to claim 1, wherein
a switch element is inserted into a supply path of the external voltage to the power source circuit, and
the external voltage is supplied to the power source circuit via the switch element only when a value of the external voltage is in an appropriate range.

5. An electricity storage system in which a plurality of electricity storage devices are connected,
wherein each of the electricity storage devices includes
a first external terminal and a second external terminal for connection to an outside,
an electricity storage unit capable of being charged and discharged,
a first power source line disposed between a positive electrode side of the electricity storage unit and the first external terminal,
a second power source line disposed between a negative electrode side of the electricity storage unit and the second external terminal,
a power source circuit connected to both the first and second power source lines and configured to supply an output voltage to a control circuit in an operating state,
a power source control circuit configured to control an operating state and a non-operating state of the power source circuit,
a first control signal generation circuit configured to supply a first control signal corresponding to transition of an external voltage applied to the first external terminal and the second external terminal to the power source control circuit to set the power source circuit in an operating state for a prescribed time, and
a second control signal generation circuit configured to generate a second control signal that allows the power source circuit to be set in an operating state continuously by the control circuit to which an output voltage of the power source circuit is supplied.

6. A method for controlling an electricity storage device, the electricity storage device including
a first external terminal and a second external terminal for connection to an outside,
an electricity storage unit capable of being charged and discharged,
a first power source line disposed between a positive electrode side of the electricity storage unit and the first external terminal,
a second power source line disposed between a negative electrode side of the electricity storage unit and the second external terminal,
a power source circuit connected to both the first and second power source lines and configured to supply an output voltage to a control circuit in an operating state, and
a power source control circuit configured to control an operating state and a non-operating state of the power source circuit,
the method comprising:
generating a first control signal corresponding to transition of an external voltage applied to the first external terminal and the second external terminal and supplying the first control signal to the power source control circuit to set the power source circuit in an operating state for a prescribed time; and
generating a second control signal by the control circuit and using the second control signal to set the power source circuit in an operating state continuously.

* * * * *